(12) United States Patent
Knol et al.

(10) Patent No.: US 11,791,115 B2
(45) Date of Patent: Oct. 17, 2023

(54) OPERATING MECHANISM FOR A SWITCH

(71) Applicant: Eaton Intelligent Power Limited, Dublin (IE)

(72) Inventors: Bert Knol, Overijssel (NL); Albert Postmus, Goor (NL)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 17/659,434

(22) Filed: Apr. 15, 2022

(65) Prior Publication Data

US 2022/0336168 A1 Oct. 20, 2022

(30) Foreign Application Priority Data

Apr. 15, 2021 (GB) ..................................... 2105357
Oct. 21, 2021 (GB) ..................................... 2115136

(51) Int. Cl.
*H01H 33/666* (2006.01)
*H02B 13/035* (2006.01)

(52) U.S. Cl.
CPC ..... *H01H 33/6664* (2013.01); *H02B 13/0354* (2013.01)

(58) Field of Classification Search
CPC .... H01H 33/6664; H01H 33/50; H01H 33/42; H01H 3/30; H01H 9/24; H01H 71/10; H01H 3/3042; H02B 13/0354
USPC ....... 218/118, 43, 12, 45, 55, 67, 78–80, 84, 218/92, 100; 200/19.2, 33 B, 50.39, 416, 200/431, 432, 438, 551
See application file for complete search history.

(56) References Cited

U.S. PATENT DOCUMENTS

| | | | | |
|---|---|---|---|---|
| 4,524,637 A * | 6/1985 | Yoshizumi | ............... | H01H 3/30 74/569 |
| 4,578,551 A * | 3/1986 | Lin | ....... | H01H 3/3042 251/74 |
| 4,683,357 A * | 7/1987 | Opfer | .................. | H01H 3/3005 74/2 |
| 5,113,056 A * | 5/1992 | Kuhn | ..................... | H01H 3/301 200/82 R |
| 8,519,290 B2 * | 8/2013 | Ricciuti | ............... | F16H 53/025 200/574 |
| 9,472,359 B2 * | 10/2016 | Ding | ........................ | H01H 9/24 |
| 9,530,578 B2 * | 12/2016 | Chen | .................... | H01H 3/3026 |
| 2008/0088396 A1 * | 4/2008 | Ahn | ......................... | H01H 3/30 335/165 |

(Continued)

*Primary Examiner* — William A Bolton
(74) *Attorney, Agent, or Firm* — LEYDIG, VOIT & MAYER LTD.

(57) ABSTRACT

The invention relates to a device for operating a switch having an operating lever for moving the switch between the open and closed position and an operating pin arranged to a moving part of the switch, wherein the device comprises a primary shaft, a secondary shaft arranged coaxially with the primary shaft, a coupling arranged between the primary shaft and the secondary shaft, a spring, a control lever extending in a radial direction from the primary shaft, a latch having a disengage lever extending in a radial direction from the primary shaft and a roller movable into the path of the disengage lever to limit rotation of the primary shaft in the first rotational direction; and, a reset lever extending in a radial direction from the secondary shaft.

8 Claims, 4 Drawing Sheets

(56) References Cited

U.S. PATENT DOCUMENTS

| | | | |
|---|---|---|---|
| 2011/0114458 A1* | 5/2011 | Lee | H01H 9/285 |
| | | | 200/43.08 |
| 2015/0041293 A1* | 2/2015 | Curnis | H01H 71/505 |
| | | | 200/293 |
| 2018/0068806 A1* | 3/2018 | Gottschalk | H01H 3/3052 |
| 2019/0131090 A1* | 5/2019 | Dixit | H01H 9/26 |

* cited by examiner

OPERATING MECHANISM FOR A SWITCH

CROSS-REFERENCE TO RELATED APPLICATIONS

This application claims priority pursuant to 35 U.S.C. 119(a) to United Kingdom Patent Application Nos. 2105357.4, filed Apr. 15, 2021, and 2115136.0, filed Oct. 21, 2021, which applications are incorporated herein by reference in their entirety.

SUMMARY

The invention relates to a device for operating a switch having an operating lever for moving the switch between the open and closed position and an operating pin arranged to a moving part of the switch.

In gas-insulated switchgear, the amount and quality of the insulating gas inside the compartment should be stable. Therefore leakage should be avoided as much as possible. However, the operating mechanism for operating the switches in the switchgear, which is preferably arranged in an airtight compartment should be operable. In order to allow the required displacement and loads to be transferred from the inside of the compartment to the outside and from the outside to the inside, mechanical connections are required. In order to reduce or even prevent leakage of the insulating gas, the number and size of the elements of the operating mechanism should be minimized.

It is an object of the invention to provide an operating mechanism according to the preamble, in which the leakage of insulating gas is reduced or even prevented.

This object is achieved according to the invention with a device for operating a switch having an operating lever for moving the switch between the open and closed position and an operating pin arranged to a moving part of the switch, wherein the device comprises:
  a primary shaft;
  a secondary shaft arranged coaxially with the primary shaft, wherein the secondary shaft has a D-shaft portion arranged for locking and releasing the operating lever of the switch by rotating the secondary shaft;
  a coupling arranged between the primary shaft and the secondary shaft, wherein the coupling has rotational play to allow for a relative axial rotation of the primary and secondary shafts between a first rotational position and a second rotational position;
  a spring for urging the primary shaft in a first rotational direction;
  a control lever extending in a radial direction from the primary shaft for contact with the operating pin of the contact such that the operating pin can move the primary shaft in a second rotational direction;
  a latch having a disengage lever extending in a radial direction from the primary shaft and a roller movable into the path of the disengage lever to limit rotation of the primary shaft in the first rotational direction; and
  a reset lever extending in a radial direction from the secondary shaft.

The advantage of using a coaxially arranged primary and secondary shaft is that less openings in the gas-tight compartment are required, which reduces or even avoids leakage. Still, tripping and resetting thereof can be done with the device according to the invention.

Due to the coupling having rotational play, it is possible to position the D-shaft portion such that the operating lever of the switch is locked and have the primary shaft coupled to the secondary shaft and being limited in rotation in the first rotational direction. The primary spring urges the primary shaft in the first rotational direction and as soon as the latch is released, the primary shaft will rotate the secondary shaft such that the D-shaft portion releases the operating lever and the switch can move to the open position.

The control lever extending in a radial direction from the primary shaft is then used to transfer the movement of the operating pin, when the switch moves to the open position, into a rotational movement of the the primary shaft in a second rotational direction, such that the latch can reset and limit rotation of the primary shaft in the first rotational direction again.

Due to the rotational play in the coupling the secondary shaft is not directly coupled to the rotation of the primary shaft and allows for rotation of the D-shaft portion at the moment, the operating lever of the switch has returned, when the switch is moved again to a closed position.

In a preferred embodiment of the device according to the invention the coupling comprises two interlocking yoke shaped parts.

The interlocking yoke parts allow for rotational play by dimensioning the width of the yoke parts and also provide for a reliable force transfer when both yoke parts are in rotational contact with each other.

In another preferred embodiment of the device according to the invention the roller of the latch is arranged on a lever rotating around an auxiliary shaft, which is parallel to the primary shaft, wherein a spring is provided to urge the roller in the second rotational direction and in contact with the disengage lever, and wherein an actuator is arranged to urge the lever with the roller in the first rotational direction.

The actuator allows for triggering the release of the primary shaft, which then rotates the D-shaft portion and releases the operating lever, such that the switch can move towards the open position. The spring allows for the lever to return to its original position after the actuator is deactivated.

A further embodiment of the device according to the invention further comprises a secondary spring for urging the secondary shaft in a second rotational direction. This ensures that the D-shaft portion returns to the rotational position in which the operating lever of the switch was locked. When the operating lever returns to the position of the closed switch, the lever will get in contact with the D-shaft portion. Due to the rotational play in the coupling, the operating lever can push the D-shaft portion in first rotational direction, such that the operating lever can pass and the D-shaft portion can return to the locked position due to the secondary spring.

The invention also relates to a combination of an operating a switch having an operating lever for moving the switch between the open and closed position and an operating pin arranged to a moving part of the switch and a device according to any of the preceding claims.

In a preferred embodiment of the combination according to the invention the switch further comprises two contacts movable relative to each other and an operating rod connected to one of the contacts, wherein the operating lever is connected to the operating rod and wherein the operating pin is fixedly arranged to the operating rod.

BRIEF DESCRIPTION OF THE DRAWINGS

These and other features of the invention will be elucidated in conjunction with the accompanying drawings.

DETAILED DESCRIPTION

Figure 1A:
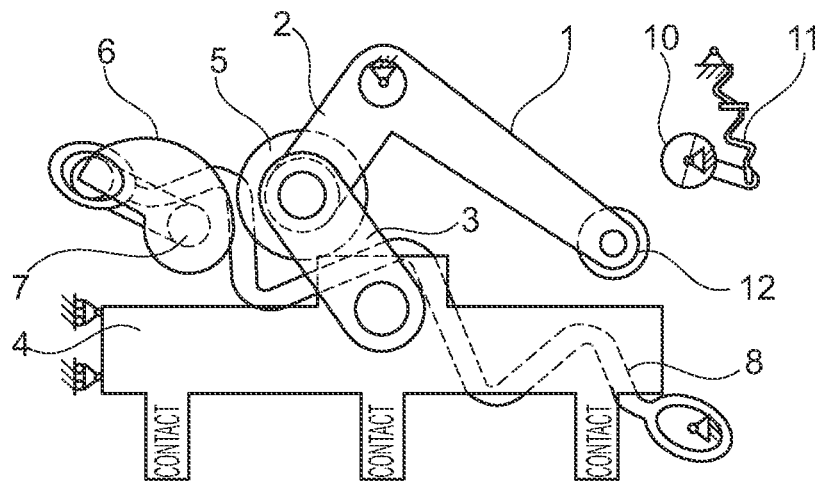
FIGS. 1A-1C show schematically an embodiment of a combination according to the invention.

FIG. 1A shows schematically an operating lever 1 which is connected to a first link 2 forming a link mechanism with a second link 3. The second link 3 is hinged to a bridge 4 with which switches can be operated.

A roller 5 is arranged at the hinge between the first link 2 and the second link 3. This roller 5 is operated by a cam 6 arranged on a cam shaft 7. A spring 8 is connected to the cam shaft 7 to assist in the closing action of the link mechanism 2, 3.

Furthermore a D-shaft portion 10, which is urged in a second rotational movement by a secondary spring 11. The free end of the operating lever 1 is also provided with a roller 12, which can co-act with the D-shaft portion 10.

FIG. 1A shows the bridge 4 and accordingly any switches operated therewith in an open position. By rotation of the cam shaft 7, the cam 6, assisted by the spring 8 will push the roller 5 such that the link mechanism 2, 3 will stretch and push the bridge 4 downward as shown in FIGS. 1B and 1C.

Figure 1B:
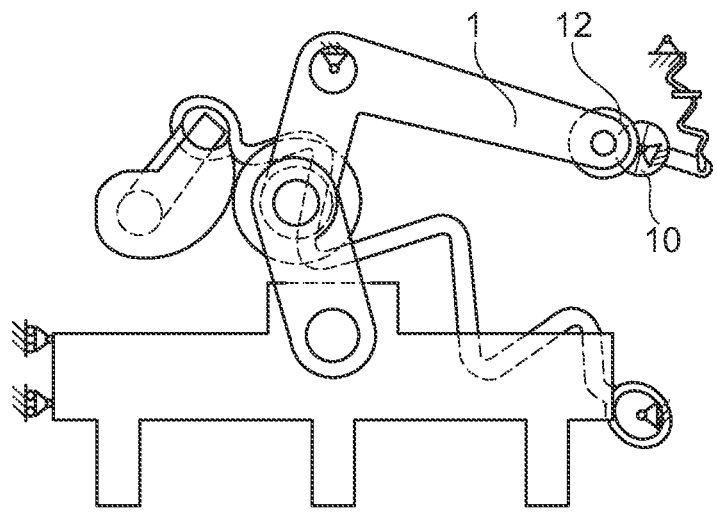
Figure 1C:
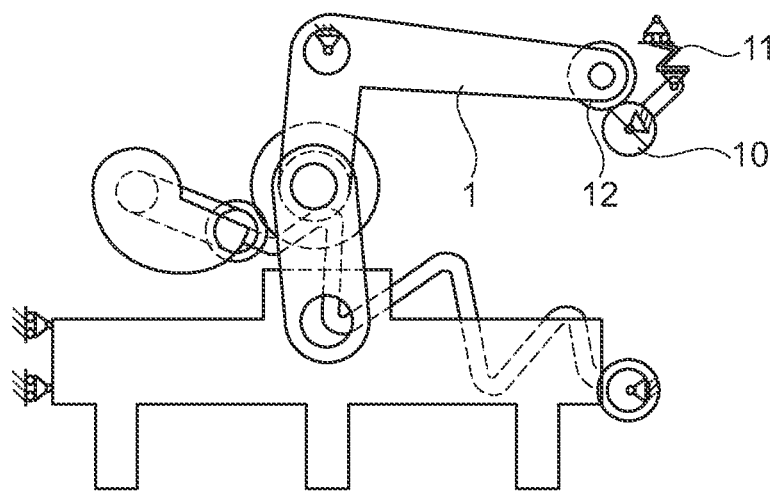

With the stretching of the link mechanism 2, 3, the roller 12 on the free end of the operating lever 1 will get in contact with the flat portion of the D-shaft portion 10, as shown in FIG. 1B and pass the D-shaft portion 10, as shown in FIG. 1C. When the roller 12 has passed the D-shaft portion 10, the secondary spring 11 can rotate the D-shaft portion 10, such that the roller 12 and the operating lever 1 are in a locked position.

Figure 2:
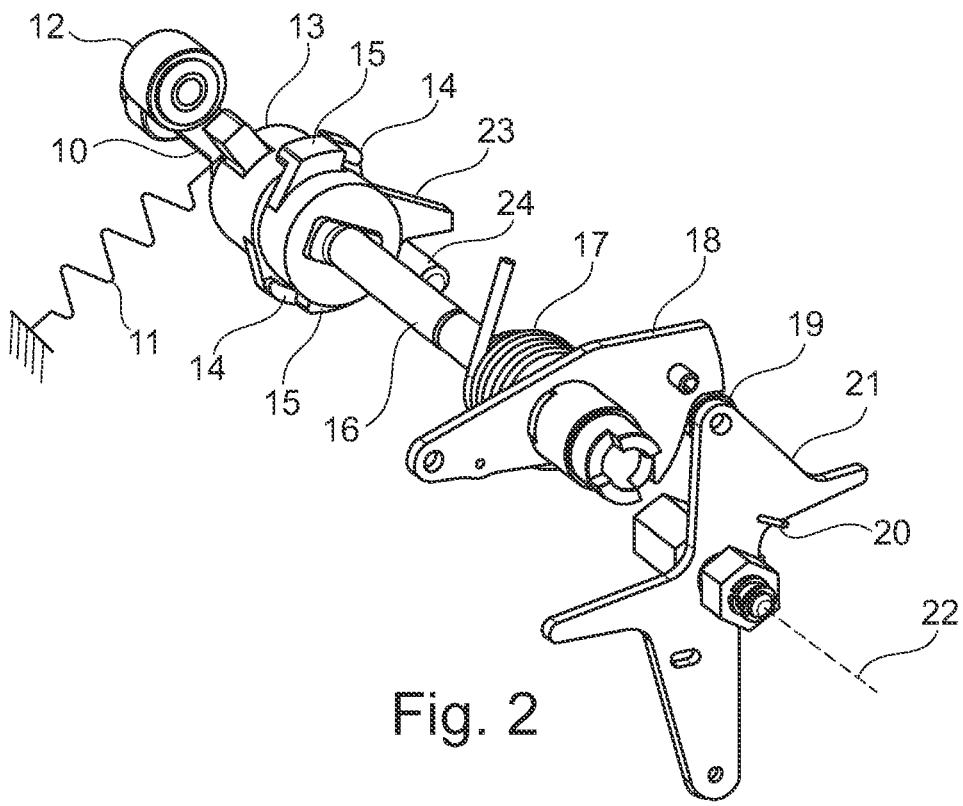
FIGS. 2-4 show the device of the combination according to the FIGS. 1A-1C in three different positions.

FIG. 2 shows the device of the combination according to the FIGS. 1A-1C with the D-shaft portion 10. This D-shaft portion 10 is arranged on a secondary shaft 13 which is coupled by two interlocking yoke portions 14, 15 to a primary shaft 16. The yoke portions 14, 15 provide rotational play between the primary shaft 16 and the secondary shaft 13.

A primary spring 17 is provided on the primary shaft 16 to urge the primary shaft 16 in a first rotational direction. A latch is provided, which comprises a disengage lever 18, a roller 19 movable into the path of the disengage lever 18 and a spring 20 to urge the disengage lever 18 in the second rotational direction. The roller 19 is arranged on a lever 21 rotating around an auxiliary shaft 22.

Also a control lever 23 is extending in radial direction from the primary shaft 16. The control lever 23 can be controlled by an operating pin 24, which is fixedly arranged to the bridge 4 and moves along with said bridge 4.

In FIG. 2, the rotation of the primary shaft 16 is limited in the first rotational direction by the lever 18 and roller 19. Also, the movement of the roller 12 of the operating lever 1 is locked by the D-shaft portion 10 (as also shown in FIG. 1C)

Figure 3:
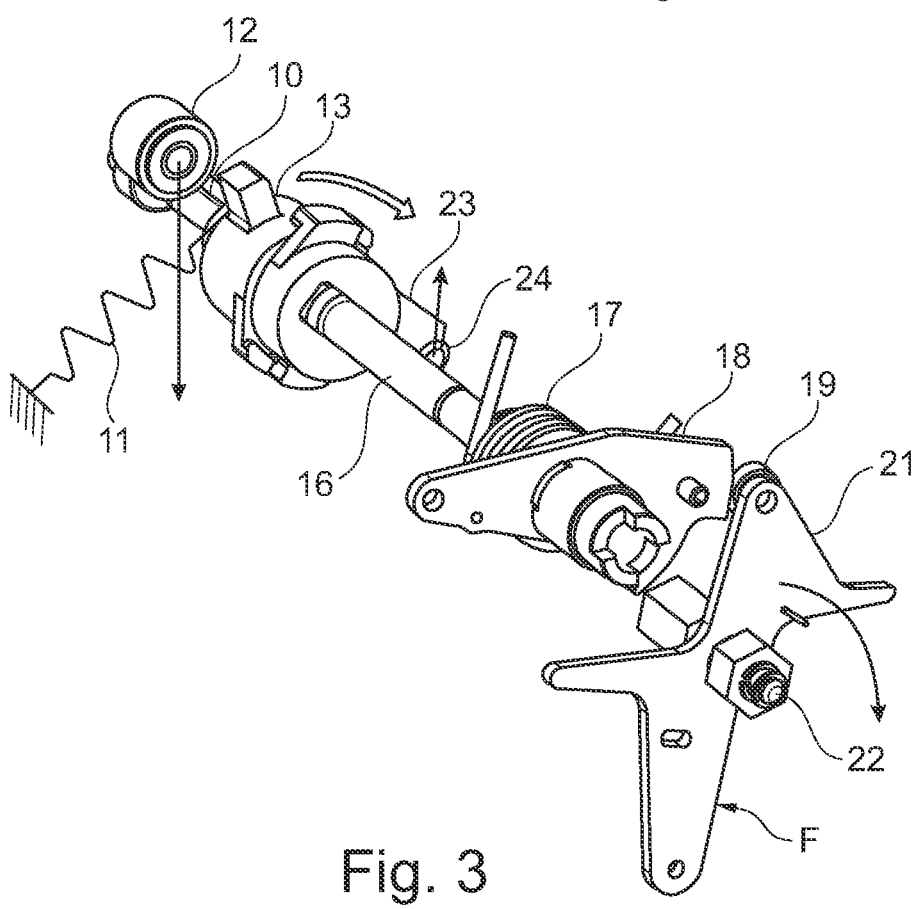

In FIG. 3, the lever 21 is rotated in the first rotational direction by exerting a force F on the lever 21, for example by an actuator. As a result, the roller 19 disengages with the disengage lever 18 such that the spring 17 can urge the primary shaft 16. Due to the coupling the secondary shaft 13 is also urged in the first rotational direction, such that the D-shaft portion 10 releases the roller 12 and the operating lever 1 can move and the switches can move to the open position.

Figure 4:
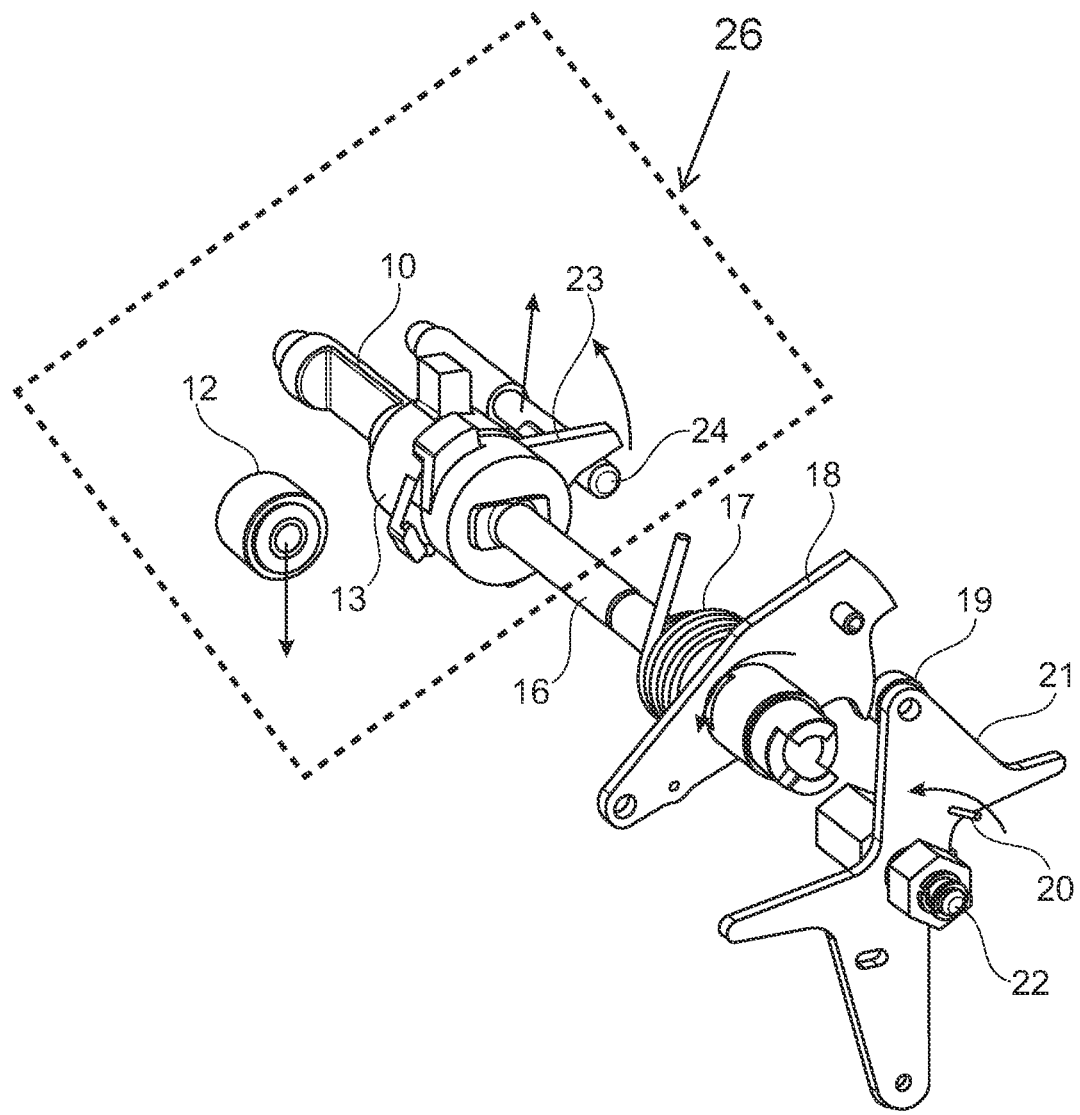

At the same time the operating pin will be moved towards the control lever 23 such that the primary shaft 16 is rotated in the second rotational direction, as shown in FIG. 4, against the force of the primary spring 17. This also allows for the lever 21 to be returned by its spring 20 to a position, where it can limit the rotational movement of the primary shaft 16 again. In other words, lever 21 can control (block or allow) rotation of the primary shaft 16. The configuration shown in FIG. 4 corresponds with the position shown in FIG. 1A.

The components of the switching mechanism which are within the airtight compartment are shown within the dashed box 26 of FIG. 4. Box 26 is a schematic illustration of the airtight compartment. By using coaxially arranged primary and secondary shafts, fewer openings in the compartment 26 are required, which reduces or even avoids gas leakage. Still, tripping and resetting of the switch can be done with the device according to the invention.

Figure 5A:
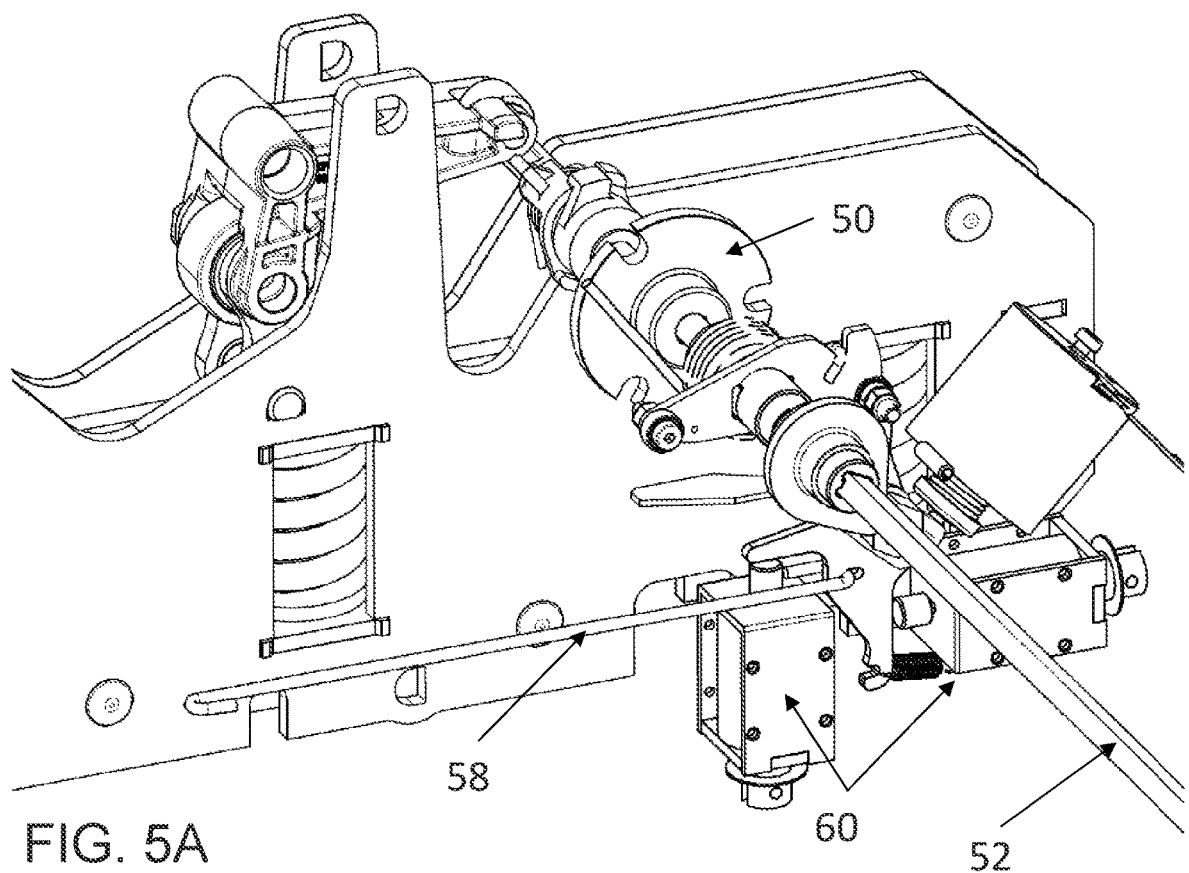
FIG. 5 compares the current arrangement (FIG. 5A) to prior art arrangements (FIG. 5B).

With reference to FIG. 5A, the device is shown in conjunction with a switch bridge. A bearing housing 50 is shown arranged on primary shaft 16. The bearing housing is fixed on the compartment 26 (not shown), and comprises seals around primary shaft 16 to reduce gas leakage from the compartment. The primary spring 17, the latch having the disengage lever 18, and lever 21 are arranged outside of the compartment. The actual switching mechanism, i.e. the control lever 23 and the D-shaped portion 10 for locking and releasing the operating lever 1 of the switch, are arranged inside the airtight compartment (as illustrated in the dashed box 26 shown in FIG. 4).

By providing coaxial shafts, i.e. by arranging the mechanism along a single axis, only one opening is needed in the bearing 50 to facilitate both the opening/closing of the switch and position indication of the switch contacts. For example a shaft extension 52 can be disposed coaxially with the primary and secondary shafts for position indication of switch contacts.

Figure 5B:
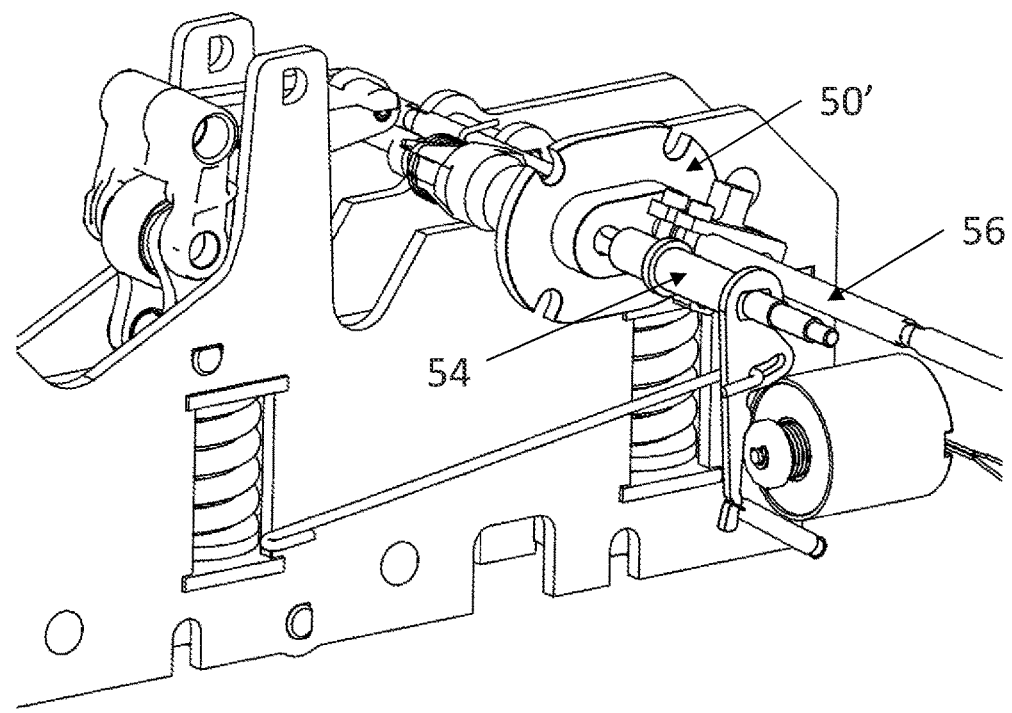

In contrast, previously known (or prior art) arrangements, such as that illustrated in FIG. 5B, require the use of shafts on two different axes: a first shaft/axis 54 for controlling opening of the contacts and a second shaft/axis 56 for position indication of the switch contacts. There are consequently two holes in the bearing 50' of FIG. 5B, and thus two holes in the airtight compartment enclosing the switching mechanism. However, the particular mechanism described herein allows for the coaxial arrangement of these different contact position and switch release shafts, providing advantages over the prior art by reducing gas leakage from the airtight compartment 26.

With further reference to FIG. 5A, a rod 58 may be provided for manual actuation or operation of lever 21 to apply force F. Additionally or alternatively, a mechanism 60 for automatic operation of lever 21 may be provided to automatically apply a force F (independent of manual actuation). In some examples, mechanism 60 comprises one or more solenoids. In FIG. 5A two solenoids are shown, but only one may be needed.

What is claimed is:

1. A device for operating a switch having an operating lever for moving the switch between an open and closed position and an operating pin arranged to a moving part of the switch, the device comprising:
   a primary shaft;
   a secondary shaft arranged coaxially with the primary shaft, wherein the secondary shaft has a D-shaft portion arranged for locking and releasing the operating lever of the switch by rotating the secondary shaft;
   a coupling arranged between the primary shaft and the secondary shaft, wherein the coupling has rotational play to allow for a relative axial rotation of the primary and secondary shafts between a first rotational position and a second rotational position;

a primary spring for urging the primary shaft in a first rotational direction;

a control lever extending in a radial direction from the primary shaft for contact with the operating pin of the contact such that the operating pin can move the primary shaft in a second rotational direction; and a latch having a disengage lever extending in the radial direction from the primary shaft and a roller movable into a path of the disengage lever to limit rotation of the primary shaft in the first rotational direction.

2. The device according to claim 1, wherein the coupling comprises two interlocking yoke shaped parts.

3. The device according to claim 1, wherein the roller of the latch is arranged on a lever rotating around an auxiliary shaft, which is parallel to the primary shaft, wherein a spring is provided to urge the roller in the second rotational direction and in contact with the disengage lever, and wherein an actuator is arranged to urge the lever with the roller in the first rotational direction.

4. The device according to claim 1, further comprising a secondary spring for urging the secondary shaft in the second rotational direction.

5. The device according to claim 4, wherein the operating lever is provided at a free end with a roller, which is in contact with a curved surface of the D-shaft portion of the secondary shaft in the closed position of the switch.

6. A combination of the operating the switch having the operating lever for moving the switch between the open and closed position and the operating pin arranged to the moving part of the switch and the device according to claim 1.

7. The combination according to claim 6, wherein the switch further comprises two contacts movable relative to each other and an operating rod connected to one of the contacts, wherein the operating lever is connected to the operating rod and wherein the operating pin is fixedly arranged to the operating rod.

8. A device for operating a switch having an operating lever for moving the switch between an open and closed position and an operating pin arranged to a moving part of the switch, the device comprising:

a primary shaft;

a secondary shaft arranged coaxially with the primary shaft, wherein the secondary shaft has a D-shaft portion arranged for locking and releasing the operating lever of the switch by rotating the secondary shaft;

a coupling arranged between the primary shaft and the secondary shaft, wherein the coupling has rotational play to allow for a relative axial rotation of the primary and secondary shafts between a first rotational position and a second rotational position;

a primary spring for urging the primary shaft in a first rotational direction;

a control lever extending in a radial direction from the primary shaft for contact with the operating pin of the contact such that the operating pin can move the primary shaft in a second rotational direction; and a latch having a disengage lever extending in the radial direction from the primary shaft and a roller movable into a path of the disengage lever to limit rotation of the primary shaft in the first rotational direction, wherein the roller of the latch is arranged on a lever rotating around an auxiliary shaft, which is parallel to the primary shaft, wherein a spring is provided to urge the roller in the second rotational direction and in contact with the disengage lever, and wherein an actuator is arranged to urge the lever with the roller in the first rotational direction.

* * * * *